United States Patent
Chen et al.

(10) Patent No.: US 7,187,184 B2
(45) Date of Patent: Mar. 6, 2007

(54) PREVENTION OF ROBOT DAMAGE VIA CAPACITIVE SENSOR ASSEMBLY

(75) Inventors: Kuen-Ei Chen, Tainan (TW);
Feng-Cheng Kuo, Pingtung (TW);
Shan-Ching Lin, Pingtung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 71 days.

(21) Appl. No.: 11/226,722

(22) Filed: Sep. 14, 2005

(65) Prior Publication Data

US 2006/0005632 A1    Jan. 12, 2006

(51) Int. Cl.
*G01R 27/26* (2006.01)

(52) U.S. Cl. .................. 324/660; 324/658; 73/570; 73/662

(58) Field of Classification Search ................ 324/658, 324/660

See application file for complete search history.

(56) References Cited

U.S. PATENT DOCUMENTS

2005/0113964 A1* 5/2005 van der Meulen .......... 700/213

FOREIGN PATENT DOCUMENTS

DE    4321056 A1 *    1/1995

* cited by examiner

*Primary Examiner*—Vincent Q. Nguyen
(74) *Attorney, Agent, or Firm*—Tung & Associates

(57) ABSTRACT

A capacitive sensor assembly for a robot to prevent damage to the robot when it moves in an undesired manner is disclosed. The robot may be used in conjunction with semiconductor fabrication applications. The capacitive sensor assembly can include a hit contact, one or more fixed contacts, one or more damping springs, and a capacitive sensor. The hit contact comes into contact with a barrier as a result of undesired movement by the robot. The damping springs are compressed against the fixed contacts when the hit contact comes into contact with the barrier. The capacitive sensor has a capacitance that changes as the hit contact comes into contact with the barrier. The capacitance of the capacitive sensor is used to detect the robot coming into contact with the barrier, so that damage to the robot can be prevented.

9 Claims, 4 Drawing Sheets

PREVENTION OF ROBOT DAMAGE VIA CAPACITIVE SENSOR ASSEMBLY

FIELD OF THE INVENTION

This invention relates generally to robots, such as can be used in conjunction with semiconductor device fabrication as well as other applications, and more particularly to robots that can be damaged when inadvertently hitting barriers.

BACKGROUND OF THE INVENTION

Robots are increasingly being used in many different applications, including semiconductor device fabrication. A robot can be generally and non-restrictively defined as a stand-alone hybrid computer system that performs physical and computational tasks. It is a multiple-motion device with one or more arms and that is capable of performing many different tasks. It can be designed similar to human form, although most industrial robots do not resemble people at all. Robots are used extensively in manufacturing, including semiconductor device fabrication.

FIG. 1 shows a robot 100 that is used to transfer semiconductor wafers between fabrication stations, so that the wafers can have semiconductor devices fabricated thereon. The robot 100 includes a fork 102 that has left and right prongs 104 and 106 used to pick up, transfer, and put down semiconductor wafers. Via a connection 108, the fork 102 connects to an arm 110, which is connected to a motor (not shown in FIG. 1) for moving the fork 102. The fork 102 may be moved in and out, rotate, twist, as well as move from one station to another.

The motor that controls the robot 100 receives communication from an internal or external computer that provides instructions as to how and where the fork 102 should be moved. Actuators of the motor, however, may temporarily lose communication with the robot 100, such that one or more instructions for movement of the fork 102 may not properly be communicated. In semiconductor fabrication applications, this can have disadvantageous, if not disastrous, consequences.

The fork 102 of the robot 100 may hit a barrier, such as a wall, the floor, a semiconductor fabrication tool, and so on. The robot 100 may be damaged, and/or the wafers that the robot 100 is holding may become broken. Both the robot 100 and the wafers it holds are typically very expensive. Therefore, miscommunication resulting in advertent movement or motion of the fork 102 of the robot 100 can cause costly errors.

Therefore, there is a need for ensuring that the fork 102 of the robot 100 does not hit barriers. More specifically, there is a need for ensuring that the fork 102 of the robot 100 does not hit barriers in a manner that causes damage to the robot 100 or the wafers that it carries. For these and other reasons, there is a need for the present invention.

SUMMARY OF THE INVENTION

The invention relates to a capacitive sensor assembly for a robot to prevent damage to the robot when it moves in an undesired manner, and also preferably to prevent damage to items the robot is carrying, such as semiconductor wafers in the application of semiconductor device fabrication. The capacitive sensor assembly can include a hit contact, one or more fixed contacts, one or more damping springs, and a capacitive sensor. The hit contact comes into contact with a barrier as a result of undesired movement by the robot. The hit contact is freely moveable along an axis of movement. The hit contact moves in one direction along this axis when coming into contact with the barrier, and moves in an opposite direction along the axis when backing away after contact with the barrier.

The damping springs have first ends connected to the hit contact and second ends connected to the fixed contacts. The damping springs are compressed against the fixed contacts when the hit contact comes into contact with the barrier. The capacitive sensor is operatively coupled to the hit contact. The sensor has a capacitance that changes as the hit contact moves along the axis of movement, resulting from its coming into contact with the barrier or backing away after contact with the barrier. The capacitance of the capacitive sensor is thus used to detect the robot coming into contact with the barrier, so that damage to the robot, and any items it is carrying, can be prevented.

Embodiments of the invention provide for advantages not found within the prior art. When inadvertent or other undesired motion of the robot results in the robot coming into contact with a barrier, the hit contact moves along its axis of motion. The damping springs damp this motion. More importantly, the capacitance of the capacitance sensor changes when the hit contact moves along its axis of motion. Detection of this change in capacitance can thus be used to determine when the robot is coming into contact with the barrier, and stop the undesired motion of the robot before damage is caused to the robot or the items it may be carrying. Still other aspects, embodiments, and advantages of the invention will become apparent by reading the detailed description that follows, and by referring to the accompanying figures.

BRIEF DESCRIPTION OF THE DRAWINGS

FIG. 3A specifically shows the situation where a barrier has not been hit.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
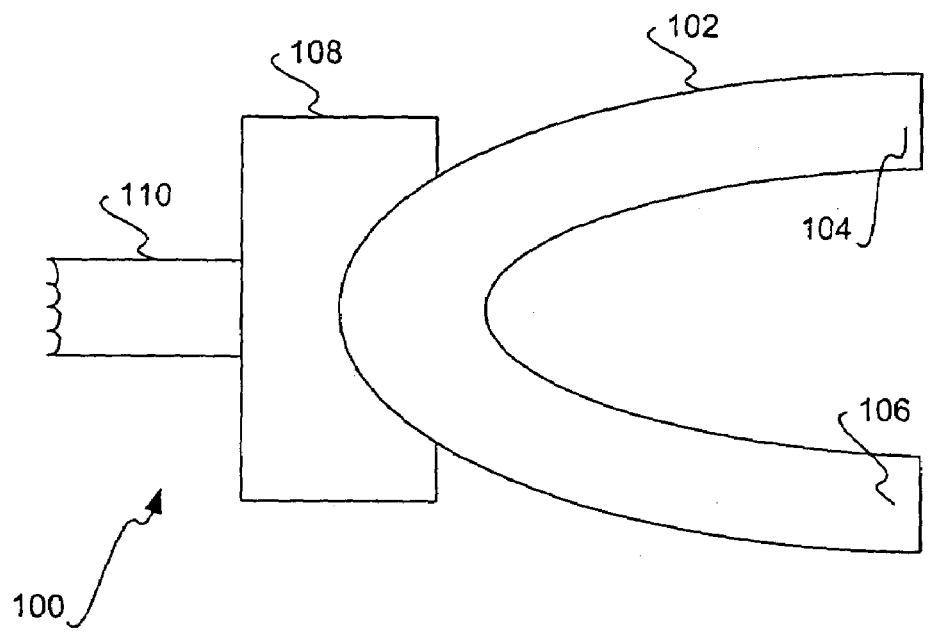
FIG. 1 is a diagram showing a robot having a fork for carrying semiconductor wafers, in accordance with which embodiments of the invention may be implemented.
Figure 2:
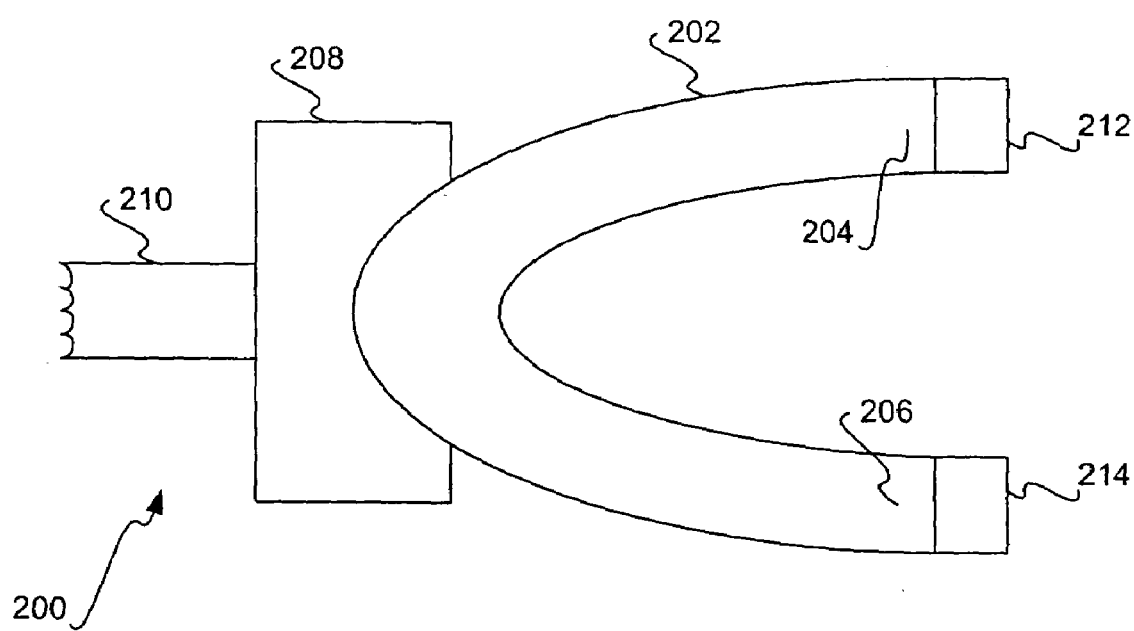
FIG. 2 is a diagram showing a robot having a fork for carrying semiconductor wafers, on which capacitive sensor assemblies have been fitted to ensure that damage is not caused to the robot, the fork, or the wafers, upon the fork hitting a barrier, according to an embodiment of the invention.

FIG. 2 shows a robot 200 according to an embodiment of the invention. The robot 200 can be used in conjunction with semiconductor fabrication, specifically as a mechanism by which semiconductor wafers are transported among different semiconductor fabrication tools. The robot 200 includes a fork 202 having a left prong 204 and a right prong 206. Via a connection 208, the fork 202 is connected to a robot arm 210, by which the fork 202 is moved, such as twisted, and so on. At the end of the left prong 204 and the right prong 206 are a capacitive sensor assembly 212 and 214, respectively. The capacitive sensor assemblies 212 and 214 detect when the left and right prongs 204 and 206, respectively, come into account with a barrier, such as can resulting when the robot 200 has moved in an undesired manner. This detection allows the robot 200 to then move back away from the barrier, or otherwise stop moving in the undesired manner, so that the robot 200, or the semiconductor wafers it might be carrying, are not damaged.

Figure 3A:
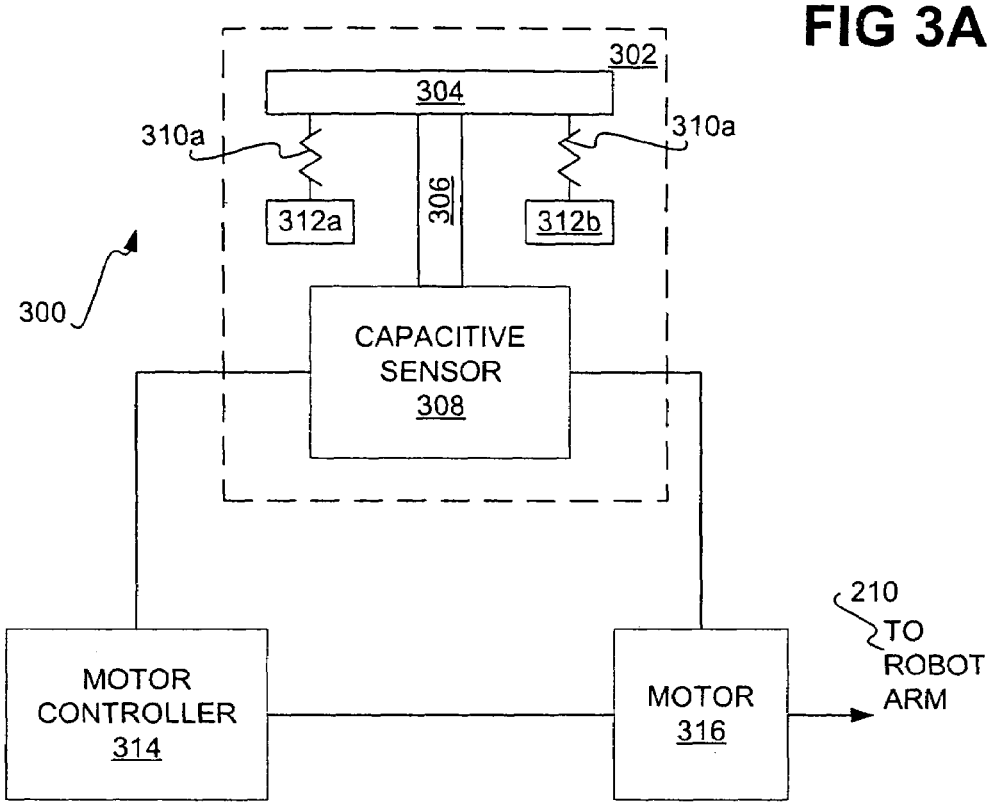
FIG. 3A is a diagram showing in detail a capacitive sensor assembly that can be fitted to a robot, such as to the forks of the robot of FIG. 1, as is shown in FIG. 2, according to an embodiment of the invention.

FIG. 3A shows a system 300 including a capacitive sensor assembly 302 that can be used as each of the assemblies 212 and 214 of FIG. 2, according to an embodiment of the invention. The system 300 is part of the system that controls a robot, such as the robot 200 of FIG. 2. As such, it has a motor controller 314 that controls a motor 316, which moves a robot arm of the robot, such as the robot arm 210 of FIG. 2. The capacitive sensor assembly 302 itself includes a hit plate 304, an arm 306 that couples the assembly 302 to the capacitive sensor 308, damping springs 310a and 310b, and fixed contacts 312a and 312b. The damping springs 310a and 310b are connected on one end of the fixed contacts 312a and 312b, respectively, whereas they are contacted on another end to the hit plate 304.

The hit plate 304 comes into contact with a barrier as a result of undesired movement by the robot. The hit plate 304 is freely moveable along an axis of movement, which coincides with the vertical direction, up and down, in FIG. 3A. The hit plate 304, and the arm 306 to which it is attached, move down when coming into contact with the barrier, and move up when backing away after contact with the barrier. The hit plate 304 and the arm 306 make up a hit contact. The damping springs 310a and 310b are compressed against the fixed contacts 312a and 312b when the hit plate 310 comes into contact with the barrier and moves down. The fixed contacts 312a and 312b are thus fixed, and do not move themselves.

Figure 3B:
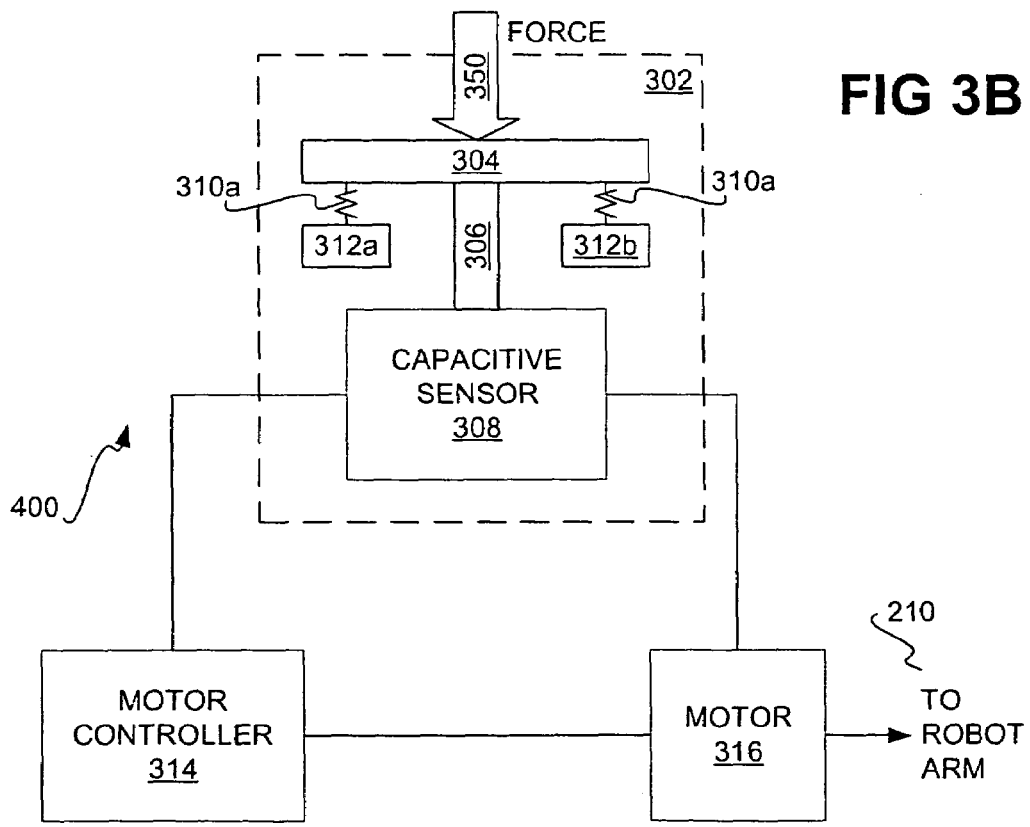
FIG. 3B is a diagram showing the capacitive sensor assembly of FIG. 3A in the situation where a barrier has been hit, and is being detected or sensed by the sensor assembly, according to an embodiment of the invention.

Whereas FIG. 3A explicitly illustrates the situation where the hit plate 304 has not come into contact with a barrier, FIG. 3B shows the system 300 where the hit plate 304 has come into contact with a barrier. A force 350 represents the barrier pushing down against the hit plate 304. This moves the arm 306 to which the hit plate 304 is attached into the capacitive sensor 308 in the embodiment of FIG. 3B. Furthermore, the springs 310a and 310b of FIG. 3A become compressed in FIG. 3B against the fixed contacts 312a and 312b, respectively, and thus are indicated in FIG. 3B as the springs 310a' and 310b'.

As a result of the arm 306 moving in and/or within the capacitive sensor 308, the capacitance of the capacitive sensor changes. That is, the capacitance changes as the hit plate 304 moves along its axis of movement resulting from it coming into contact with a barrier, or backing away after contact with the barrier. In this way, the capacitance of the capacitive sensor 308 is used to detect the robot of which the system 300 is a part coming into contact with a barrier, so that damage to the robot, as well as the items it is carrying, can be prevented. This is accomplished by the motor controller 314 detecting the change in capacitance of the capacitive sensor 308, and accordingly causing the motor 316 to which an arm of the robot is attached to stop moving, or back away from the barrier, so that damage is not caused. The controller 314, in other words, causes the motor 316 to move or stop the robot arm, and hence the robot.

Figure 4A:
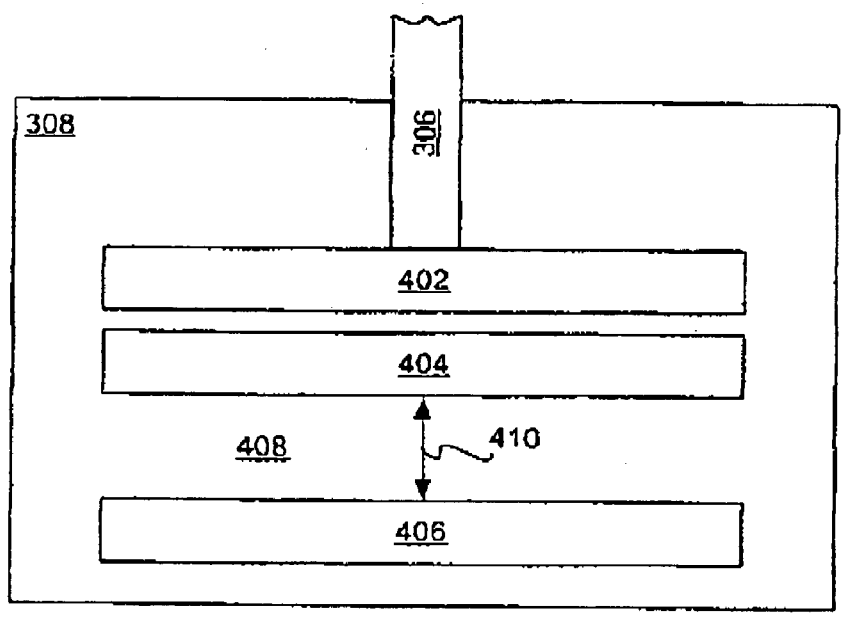
FIG. 4A is a diagram showing a capacitive sensor according to an embodiment of the invention that can be used as the capacitive sensor assemblies of FIGS. 3A and 3B.

FIG. 4A shows one embodiment of the capacitive sensor 308 of FIGS. 3A and 3B. The capacitive sensor 308 includes an internal hit plate 402, a movable capacitive plate 404 under the internal hit plate 402, a fixed capacitive plate 406, and a compressible dielectric 408 between the plates 404 and 406. The compressible dielectric 408 thus has a top side and a bottom side, where the movable plate 404 is located on the top side, and the fixed plate 406 is located on the bottom side. Furthermore, the movable plate 404 has a top side and a bottom side, where the internal hit plate 402 is located on its top side, and the dielectric 408 is located on its bottom side. When the hit plate 304 of FIGS. 3A and 3B moves downward along its axis of movement, the arm 306 correspondingly moves downward. The internal hit plate 402, attached to another end of the arm 306, thus also moves downward. This forces the movable capacitive plate 404 to compress the dielectric 408 by pressing the dielectric 408 against the fixed capacitive plate 406, decreasing the distance 410. The fixed capacitive plate 406 does not move.

By decreasing the distance 410, the capacitance of the capacitive sensor 308 is changed. This is because capacitance is equal to a constant times the surface area of the smaller of the fixed capacitive plate 406 and the movable capacitive plate 404, divided by the distance 410 between the plates 402 and 406. The constant is a permittivity constant, and may generally be equal to $8.85 \times 10^{-12}$ in at least some embodiments of the invention. The surface area of the smaller plate of the plates 404 and 406 does not change. Therefore, by decreasing the distance between the plates 404 and 406, ultimately resulting from the hit plate 304 of FIGS. 3A and 3B coming into contact with a barrier, the capacitance of the capacitive sensor 308 increases.

Figure 4B:
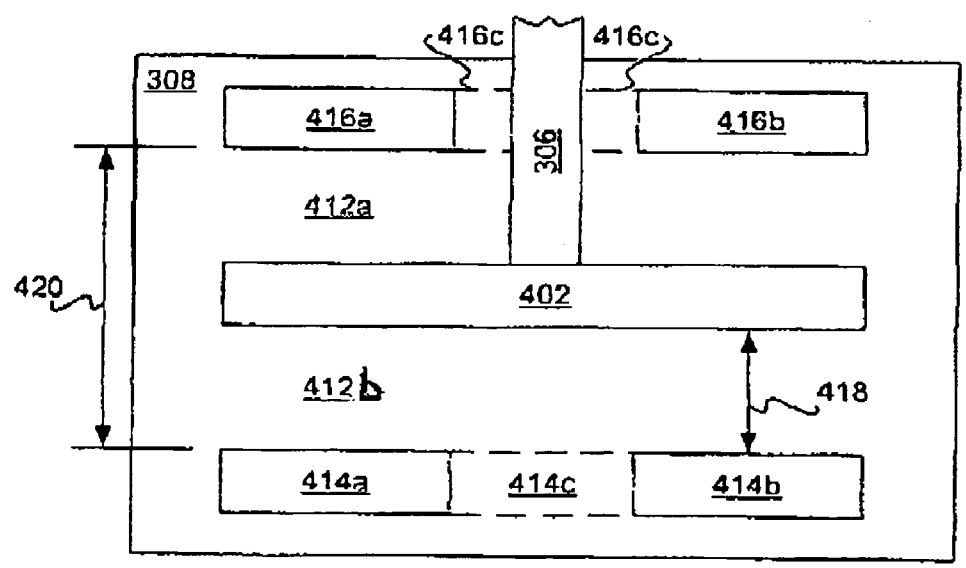
FIG. 4B is a diagram showing a capacitive sensor according to another embodiment of the invention that can be used as the capacitive sensor assemblies of FIGS. 3A and 3B.

FIG. 4B shows another embodiment of the capacitive sensor 308 of FIGS. 3A and 3B. The capacitive sensor 308 still includes the internal hit plate 402, but the internal hit plate 402 no longer presses against a movable capacitive plate. Rather, there are two fixed capacitive plates, first capacitive plates 414a and 414b, and second capacitive plates 416a and 416b. Because FIG. 4B is a cross-sectional view of the sensor 308 in one embodiment, the first capacitive plates 414a and 414b can constitute one plate that is circular in nature, and where the plates 414a and 414b are connected to one another via a back circular section indicated as the plate 414c. Similarly, the second capacitive plates 416a and 416b can constitute another plate that is circular in nature, and where the plates 416a and 416b are connected to one another via a back circular section indicated as the plate 416c. The dielectric has two parts, a first dielectric part 412a, and a second dielectric part 412b. At least the second dielectric part 412b is compressible, such that it is said that the dielectric as a whole is at least partially compressible. The dielectric thus has a bottom side and a top side, where the first capacitive plates 414a and 414b are located on the bottom side, and the second capacitive plates 416a and 416b are located on the top side.

When the hit plate 304 of FIGS. 3A and 3B moves downward along its axis of movement, the arm 306 to which the hit internal plate 402 is attached correspondingly moves downward. The internal hit plate 402, attached to another end of the arm 306, thus also moves downward. This compresses the dielectric part 412b by pressing the dielectric part 412b against the fixed capacitive plates 414a and 414b, decreasing the distance 418, of which the distance 420 between the plates 414a and 414b, and the plates 416a and 416b, encompasses. By decreasing the distance 418, and hence the distance 420, the capacitance of the capacitive sensor 308 is changed, and is more specifically increased, as has been described.

Figure 5:
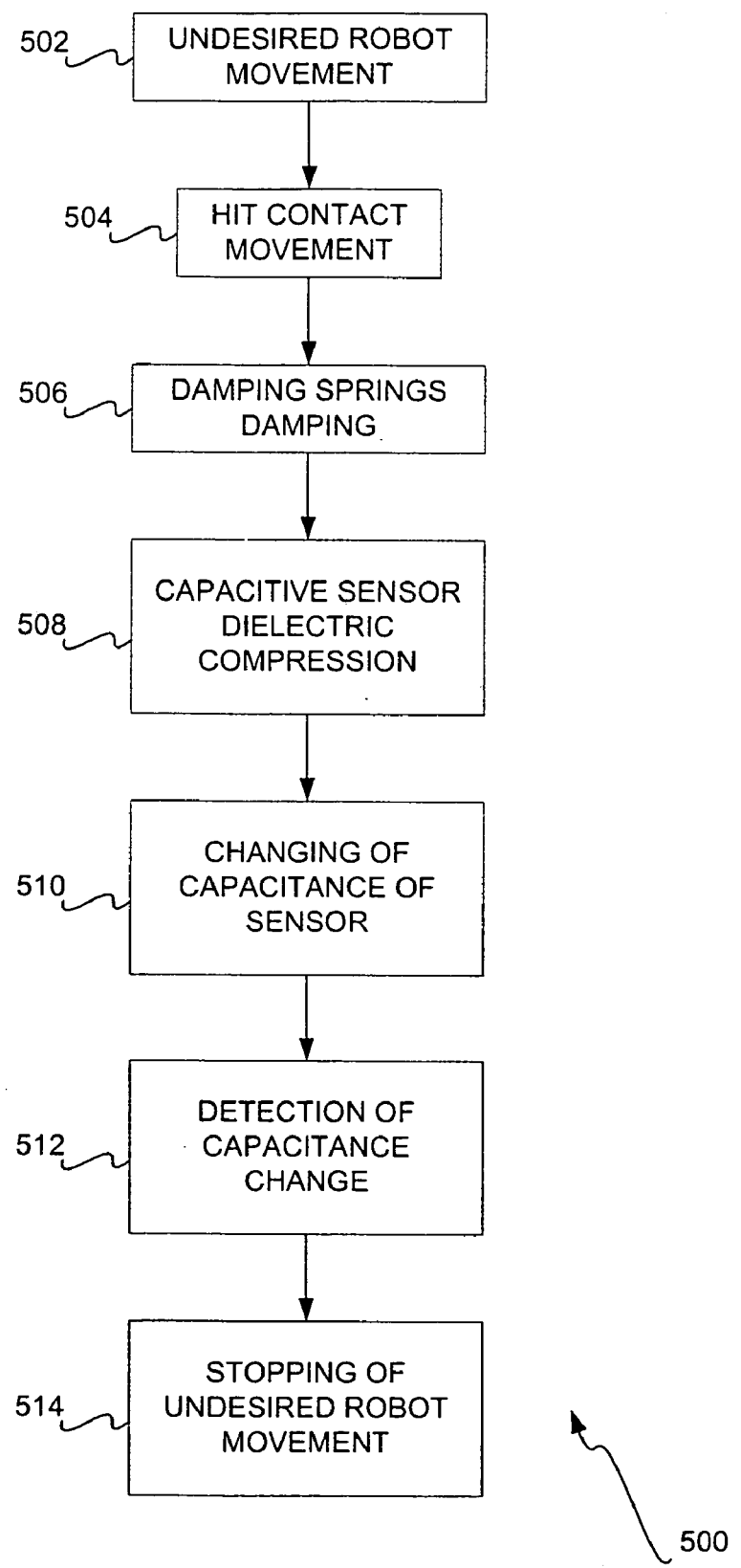
FIG. 5 is a flowchart of a method as to how a capacitive sensor is used to prevent robot and/or semiconductor wafer damage, according to an embodiment of the invention.

FIG. 5 shows a method 500 according to an embodiment of the invention. The method 500 can be performed by the robot 200 of FIG. 2, and the system 300 of FIGS. 3A and 3B. That is, the method 500 may be used in conjunction with semiconductor device fabrication applications, such as to transfer semiconductor wafers. The method 500 is specifically for preventing damage to the robot, and the items it carries, such as the semiconductor wafers. Undesired robot movement occurs (502), that causes a hit contact to come into contact with a barrier, moving the hit contact along its axis of movement (504), which causes the damping springs to damp (506).

Furthermore, the hit contact movement causes compression of a capacitive sensor dielectric (508), which changes the capacitance of the sensor (510). The compression of the dielectric may be caused by a moveable capacitive plate of the sensor moving as a result of the hit contact moving, which causes the dielectric to compress against a fixed capacitive plate of the sensor. Alternatively, the compression may be caused by an internal and moveable hit plate of the capacitive sensor moving because of the hit contact moving, which causes the dielectric to again compress against a fixed capacitive plate of the sensor. This change in capacitance is detected (512), resulting in the robot stopping its undesired movement (514).

It is noted that, although specific embodiments have been illustrated and described herein, it will be appreciated by those of ordinary skill in the art that any arrangement is calculated to achieve the same purpose may be substituted for the specific embodiments shown. This application is intended to cover any adaptations or variations of the present invention. Therefore, it is manifestly intended that this invention be limited only by the claims and equivalents thereof.

What is claimed is:

1. A robot comprising:
   a fork having a left prong and a right prong;
   a left capacitive sensor assembly coupled to the left prong to detect via a change in capacitance when the left prong has come into contact with a barrier as a result of undesired fork movement; and,
   a right capacitive sensor assembly coupled to the right prong to detect via a change in capacitance when the right prong has come into contact with a barrier as a result of undesired fork movement.

2. The robot of claim 1, wherein the capacitive sensor of each of the left and the right capacitive sensor assemblies comprises:
   a compressible dielectric having a first side and a second side;
   a fixed capacitive plate located to the first side of the dielectric;
   a movable capacitive plate located to the second side of the dielectric and that can compress the compressible dielectric to change the capacitance of the capacitive sensor; and,
   an internal hit plate operatively coupled to the hit contact and located to a side of the movable capacitive plate opposite of another side of the movable capacitive plate on which the second side of the dielectric is located, such that movement of the hit contact results in movement of the internal hit plate, causing the internal hit plate to press against and move the movable capacitive plate, compressing the compressible dielectric and changing the capacitance of the capacitive sensor.

3. The robot of claim 1, wherein the capacitive sensor of each of the left and the right capacitive sensor assemblies comprises:
   an internal hit plate operatively coupled to the hit contact;
   a dielectric at least partially compressible and having a first side and a second side in-between which the internal hit plate is located, such that movement of the hit contact results in movement of the internal hit plate and compression of the dielectric, changing the capacitance of the capacitive sensor;
   one or more first capacitive plates located to the first side of the dielectric; and,
   one or more second capacitive plates located to the second side of the dielectric.

4. The robot of claim 1, wherein the robot is used in conjunction with semiconductor device fabrication.

5. The robot of claim 4, wherein the robot is used to transfer semiconductor wafers via the fork, such that the left and the right capacitive sensor assemblies are for preventing damage to the semiconductor wafers.

6. A robot comprising:
   a fork having a left prong and a right prong;
   a left capacitive sensor assembly coupled to the left prong to detect via a change in capacitance when the left prong has come into contact with a barrier as a result of undesired fork movement;
   a right capacitive sensor assembly coupled to the right prong to detect via a change in capacitance when the right prong has come into contact with a barrier as a result of undesired fork movement;
   a robot arm coupled to the fork;
   a motor to move the robot arm and correspondingly move the fork;
   a motor controller communicatively coupled to the left capacitive sensor and the right capacitive sensor, the controller causing the motor to move the robot arm and correspondingly move the fork, the controller stopping movement of the motor and correspondingly stopping movement of the fork in response to the change in capacitance detected by at least one of the left capacitive sensor assembly and the right capacitive sensor assembly.

7. The robot of claim 6, wherein the fork is for handling semiconductor wafers in conjunction with semiconductor device fabrication.

8. A robot comprising:
 a fork having a left prong and a right prong;
 a left capacitive sensor assembly coupled to the left prong to detect via a change in capacitance when the left prong has come into contact with a barrier as a result of undesired fork movement;
 a right capacitive sensor assembly coupled to the right prong to detect via a change in capacitance when the right prong has come into contact with a barrier as a result of undesired fork movement;
 wherein each of the left and the right capacitive sensor assemblies comprises:
 a hit contact attached to one of the left and the right prongs and that comes into contact with a barrier as a result of undesired movement by the robot, the hit contact freely moveable along an axis of movement, and moving in one direction along the axis of movement when coming into contact with the barrier and moving in an opposite direction along the axis of movement when backing away after contact with the barrier;
 one or more fixed contacts;
 one or more damping springs having first ends connected to the hit contact and second ends connected to the one or more fixed contacts, the one or more damping springs being compressed against the one or more fixed contacts when the hit contact comes into contact with the barrier; and,
 a capacitive sensor operatively coupled to the hit contact and having a capacitance that changes as the hit contact moves along the axis of movement resulting from coming into contact with the barrier or backing away after contact with the barrier, the capacitance of the capacitive sensor used to detect the one of the left and the right prongs coming into contact with the barrier so that damage to the robot can be prevented.

9. The robot of claim 8, wherein the fork is for handling semiconductor wafers in conjunction with semiconductor device fabrication.

* * * * *